United States Patent [19]
Reddoch

[11] Patent Number: 5,884,715
[45] Date of Patent: Mar. 23, 1999

[54] METHOD AND APPARATUS FOR INJECTING DRILLING WASTE INTO A WELL WHILE DRILLING

[76] Inventor: Jeffrey Reddoch, P.O. Box 82098, Lafayette, La. 70598-2098

[21] Appl. No.: 904,797

[22] Filed: Aug. 1, 1997

[51] Int. Cl.$^6$ .............................. E21B 21/06; B09B 5/00
[52] U.S. Cl. .............................. 175/66; 175/207; 405/128
[58] Field of Search .............................. 405/128; 175/66, 175/206, 207, 111; 166/305.1, 209

[56] References Cited

U.S. PATENT DOCUMENTS

| | | | |
|---|---|---|---|
| 3,347,319 | 10/1967 | Littlejohn | 166/290 X |
| 4,942,929 | 7/1990 | Malachosky et al. | 175/206 X |
| 5,085,277 | 2/1992 | Hopper | 166/341 |
| 5,129,469 | 7/1992 | Jackson | 175/206 X |
| 5,613,242 | 3/1997 | Oddo | 405/128 X |
| 5,662,169 | 9/1997 | Hosie | 405/128 X |

Primary Examiner—David J. Bagnell
Attorney, Agent, or Firm—Robert Montgomery

[57] ABSTRACT

A method for disposing of drill cuttings generated during the process of drilling oil and gas wells, by injection into the annulus of a well bore and into the earth formation, throughout the well bore operation through the use of secondary casings, injection tubes attached externally to the surface casing string and by injection into a special well bore directionally drill adjacent the primary well bore in a path leading away from the primary well.

4 Claims, 4 Drawing Sheets

METHOD AND APPARATUS FOR INJECTING DRILLING WASTE INTO A WELL WHILE DRILLING

BACKGROUND OF THE INVENTION

1. Field of the Invention

The present invention relates to the injection of drill cutting by deposition into the annulus around a well casing and more particularly to the injection of such cuttings in a well being drilled at a much earlier stage than is presently considered feasible.

2. General Background

In oil and gas well development operations, the handling and disposal of the waste material entrained in the fluid during the drilling process, commonly known as the drill cuttings, has become an increasingly difficult problem. Environmental regulations and considerations prohibit or make undesirable the surface disposal of so-called drilling muds and drill cutting. On the other hand certain categories of material produced in the drilling process may be reclaimable as useful construction materials such as various grades of sand or gravel. Such material may be used to back-fill reserve pits and to construct and maintain road beds etc. Moreover, although the disposal of drilling fluids and materials such as clay, shale or fine earth particles, brought to the surface in the drilling process, may be unwanted from an environmental impact perspective, the disposal of these materials into subterranean formations may be acceptable and possibly beneficial.

To this end the present inventive process has been developed with a view towards providing a unique system and method for disposing of certain materials generated during the process of drilling oil and gas wells and the like. The injection of drill cuttings into the annulus of a well bore is not unique. However, the present injection process takes place only during the last phase of the drilling process, generally during the last 20% of the well bore usually after the intermediate casing has been set. Since drill cutting are generated throughout the well drilling process, it is essential that the cutting be contained, stored or otherwise disposed of during the first 80% of the drilling operation, thereby incurring excessive high cost for collection and transportation. Therefore there is a need to utilize the cuttings injection process throughout the drilling process thus reducing cost and adverse environmental impact as a result of transport and disposal of the cuttings at a remote site.

SUMMARY OF THE INVENTION

The present invention is directed to a method for disposing of certain waste materials generated during the process of drilling oil or gas wells in a manner which allows for the injection of such materials as a slurry into a subterranean formation throughout most of the well boring operation. The present inventive concept discloses a process which allows for drill cutting to be injected at a much earlier stage of the drilling operation. One such method would provide a well head which includes a predrilled well bore adjacent the well being drilled. The predrilled well bore being directionally drilled in a path leading away from the oil or gas well being drilled. The cuttings from the oil or gas well currently being drilled would then simply be injected down the predrilled well bore and into the earth formation. A second method is to provide an injection tube which extends below well head and runs alongside and attached to the surface casing located between the drive casing and surface casing. The injection tube being extended with the length of the surface casing string. Therefore, as soon as the surface casing string is set and cemented, perforation of the injection tube permits injection to begin. A third method is to provide a secondary casing between the first drive casing and the surface casing string thereby providing an annulus which is plugged at its lower end when the surface casing string is set. The secondary casing and its setting cement is then perforated to allow for cuttings injection. Each of these three methods allows cuttings injection to take place in the well being drilled in the upper two thirds of the well bore rather than only in the last third.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
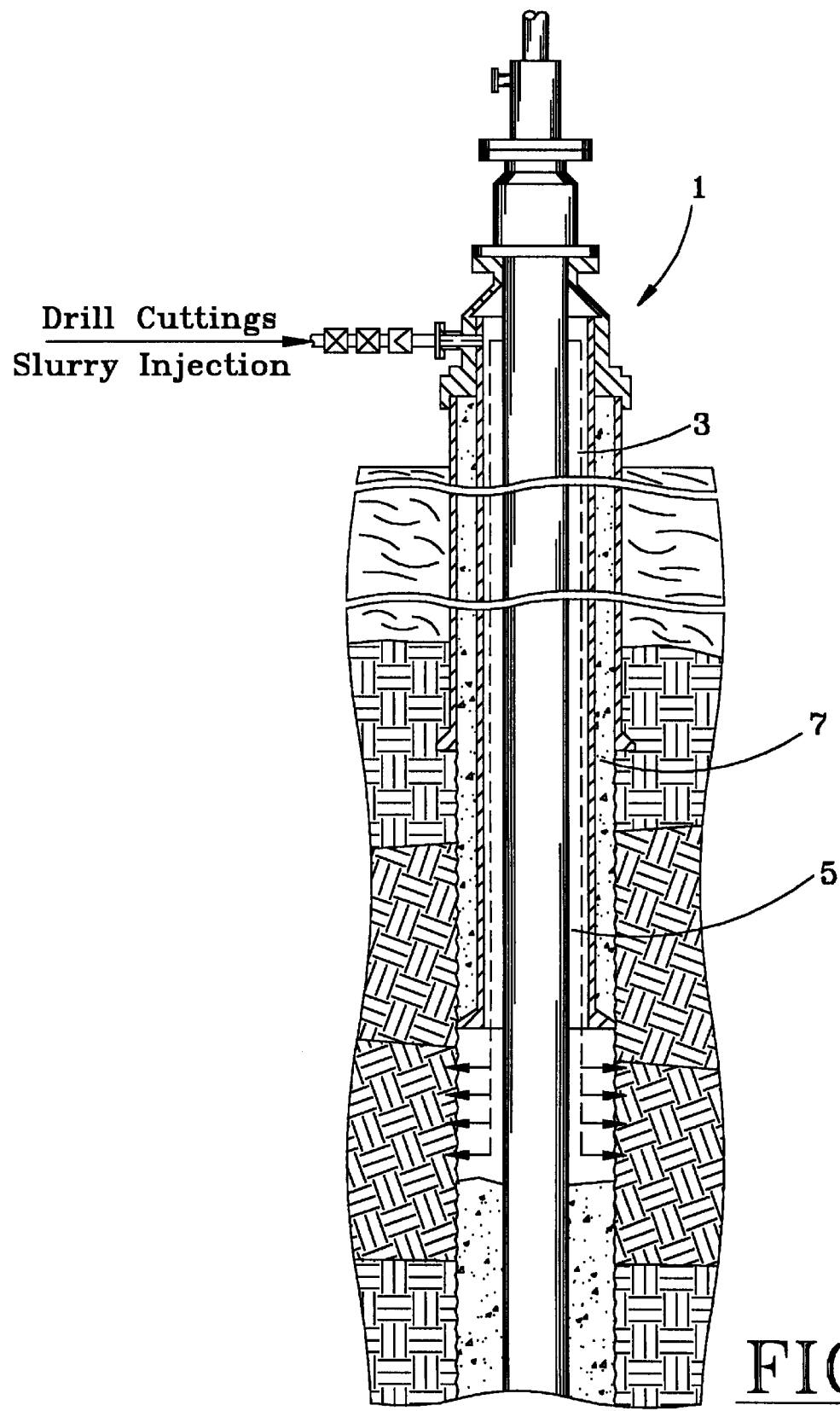
FIG. 1 is a cross sectional view of a typical well head showing prior art method of cuttings injection.
Figure 2:
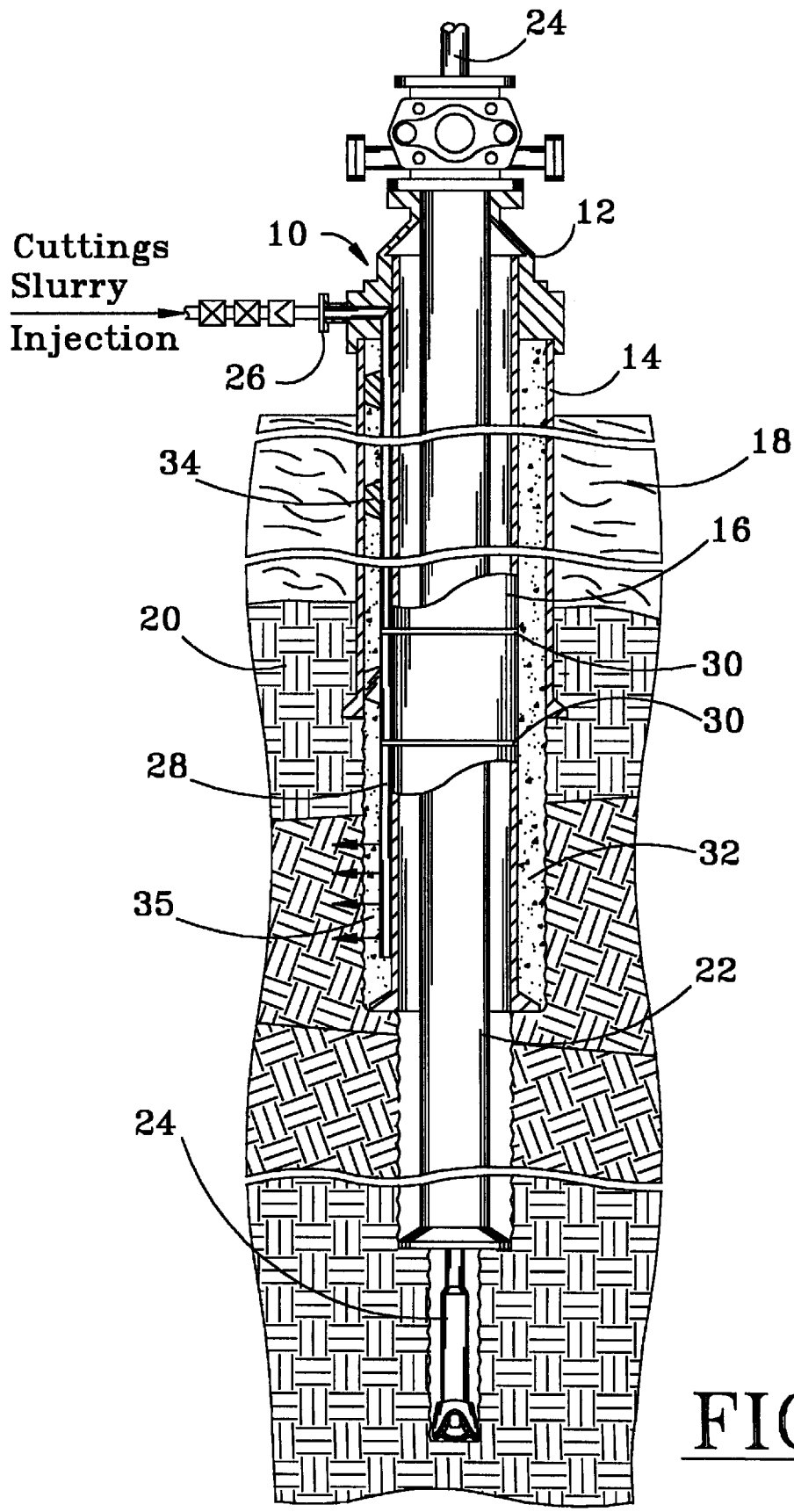
FIG. 2 is a cross sectional view of a typical well head showing an injector tube attached to the surface string casing.
Figure 4:
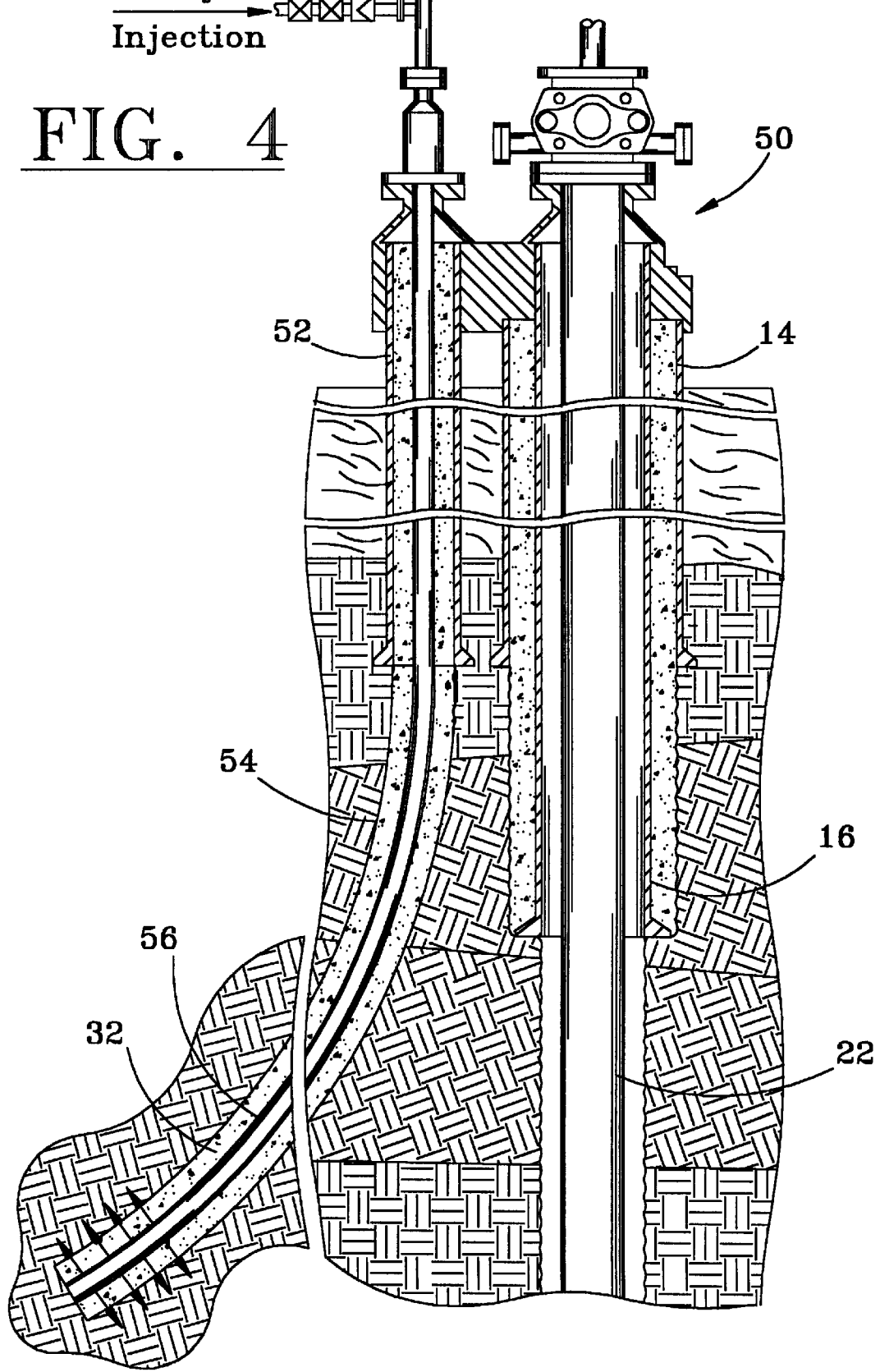
FIG. 4 is a cross sectional view of a non-typical well head showing a secondary well bore and tubing string.

As seen by viewing FIG. 1 the prior art is shown which demonstrates that at least in most cases 80–100% of the drilling operation must be completed before attempting to inject drill cuttings via the well head 1 into the annulus 3 located between the production or intermediate casing 5 and the surface casing string 7. As seen in this case the production string 5 and the surface casing string 7 must be set by cementing them into the earth formation prior to injection of the drill cutting slurry. Therefore, all waste materials must be contained or disposed of during most of the drilling operation. As cost soar for containing and transporting drilling waste material, it is therefore becoming imperative that new and improved methods for injecting cuttings back into the well being drilled. One such innovative method can be seen in FIG. 2 wherein a well head 12 is modified to accommodate an injection tube 28 and connection 26, in addition to a drive or conductor casing string 14 and a surface casing string 16, the drive casing 14 passing through a body of water 18 and into the seabed earth formation 20. A production or intermediate casing 22 is centrally located within the surface casing 16. By providing an injection tube connection 26 in the well head 12 for a tube 28 to be attached along the length of the surface casing 16 by straps 30, and protected by spacers 34, a path is thereby provided for injecting well cuttings slurry into the earth formation as soon as the surface casing string 16 has been cemented 32 in place. This is usually done within the first 3000 ft of well bore. By perforating the lower extremity 35 of the tube 28 and its surrounding cement 32 the cuttings slurry can be forced into the earth formation 20 by high pressure injection. Yet another alternative is to simply drill a second small bore hole adjacent the planned well site as seen in FIG. 4. By modifying the drill head 50 so that it comprises a special casing head having a primary bore drive casing and an auxiliary but substantially smaller drive casing 52. In such cases the injection well bore 54 can be directionally drilled away from the production well site and into more acceptable earth formation for the injection of drill cuttings via high pressure injection. A tubing string 56 can then be inserted into injection bore 54 and set with cement 32. The extremity of the tubing string 56 can then be perforated thus allowing the cuttings injection process to begin.

Figure 3:
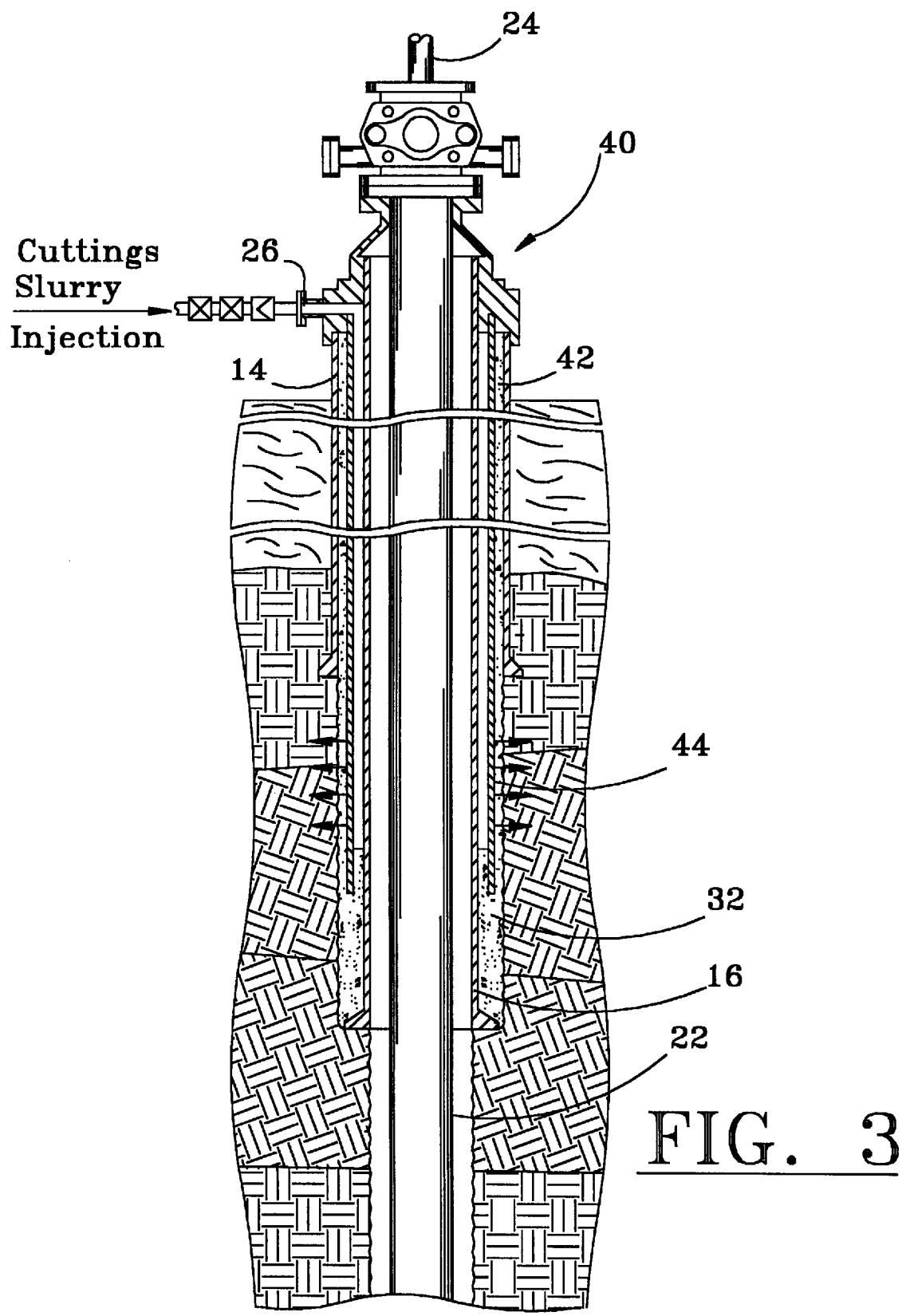
FIG. 3 is a cross sectional view of a typical well head showing a secondary casing surrounding the $1^{st}$ surface string.

An alternative method 40 may be seen in FIG. 3 where the well casing head is modified to include a secondary casing 42 between the first drive casing 14 and the surface casing string 16, thus providing an annulus connected to the slurry injection connection 26. In this case when the surface casing is cemented in place the lower extremity 44 of the secondary casing 42 is plugged and can therefor be perforated in the same manner as the injection tube 28 as discussed above.

Obviously the same processes can be used in sub sea operations where the cuttings slurry is fed to the well head 10 on the sea floor, as discussed above, via external tubing attached to riser casings connecting the surface vessel or platform to the well head 10 and connected to the injection tube 26.

Because many varying and different embodiments may be made within the scope of the inventive concept herein taught, and because many modification may be made in the embodiments herein detailed in accordance with the descriptive requirement of the law, it is to be understood that the details herein are to be interpreted as illustrative and not in any limiting sense.

What is claimed is:

1. A method of injecting oil and gas well drill cuttings, produced from a well being drilled, back into the earth formation adjacent the well being drilled comprising the steps of:
    a) modifying a well casing head to accommodate an injection tube having an external connection port, said casing head being capable of accommodating at least a drive casing, and a surface casing;
    b) driving said drive casing into an earth formation;
    c) installing said well casing head on said drive casing;
    d) extending an injection tube, into a well being drilled into said earth formation, between said drive casing and said surface casing in a progressive manner parallel to and cooperative with each length of said surface casing;
    e) securing said injection tube to said surface casing and said well head;
    f) cementing the formation around at least a portion of said surface casing and said injection tube; and
    g) perforating at least a portion of said injection tube and said cementing; and injecting a well cuttings slurry, removed while drilling said earth formation, into said injection tube and into said earth formation via said perforated portion of said injection tube and cementing.

2. A method of injecting oil and gas well drill cuttings, produced from a well being drilled, back into the earth formation adjacent the well being drilled comprising the steps of:
    a) modifying a well casing head to include primary and auxiliary casing heads, said primary casing head portion being capable of accommodating at least a drive casing, and a surface casing and said auxiliary casing head portion being capable of accommodating at least a drive casing;
    b) driving said drive casing into an earth formation for both primary and auxiliary well bores;
    c) installing said modified well casing head on said primary and auxiliary drive casings;
    d) drilling said earth formation and inserting said primary surface casing into said formation;
    e) drilling said earth formation for said auxiliary surface casing in a direction leading away from said primary surface casing;
    f) cementing said earth formation around at least a portion of said auxiliary surface casing; and
    g) perforating at least a portion of said auxiliary surface casing and surrounding cementing, and injecting a well cuttings slurry, removed while drilling said earth formation from said primary and auxiliary earth formations, into said auxiliary surface casing and into said earth formation via said perforated portion of said auxiliary surface casing and cementing.

3. An apparatus for injecting drilling waste into a well formation while drilling comprising:
    a) a well casing head adapter having at least one aperture for interposing an injection tube;
    b) a subsurface well casing attached to said casing head adapter extending into an earth formation; and
    c) at least one injection tube transiting said well head adapter extending longitudinally, adjacent said casing, said injection tube having means for communicating with injecting drill cuttings into said earth formation for disposal of said cuttings.

4. A method of injecting oil and gas well drill cuttings, into an earth formation adjacent a well during drilling operations comprising the steps of:
    a) providing a well, casing head adapter having at least one aperture for interposing an injection tube;
    b) attaching a subsurface well casing to said casing head adapter extending into an earth formation;
    c) transiting said well head adapter with at least one injection tube extending longitudinally adjacent said casing;
    d) cementing-in at least a portion of said injection tube and said casing extending into said formation said injection tube having a means for communicating with said earth formation; and
    e) injecting said drill cuttings into said earth formation through said injection tube.

* * * * *